Patented Apr. 23, 1935

1,998,605

UNITED STATES PATENT OFFICE 1,998,605

FLAKED SODIUM BISULPHATE COMPOSITION

Ernest R. Boller, Willoughby, Ohio, assignor to The Grasselli Chemical Company, Cleveland, Ohio, a corporation of Delaware No Drawing. Application May 31, 1934, Serial No. 728,309

2 Claims. (Cl. 23—239)

Sodium bisulphate has been produced in the form of discrete flakes by running molten sodium bisulphate, or nitre cake over cooled moving surfaces and breaking up the solidified film into individual flakes.

Due to the corrosive nature of the sodium bisulphate and its relatively high melting point such operations entail various difficulties which render them uneconomical.

I have found that the desired flake form for nitre cake can be obtained in a much more simple manner and my invention comprises this method of flaking sodium bisulphate and the new composite flakes obtained by my novel method.

In following my invention I mix granulated or finely divided sodium bisulphate with a concentrated solution of an organic adhesive, spread the obtained paste upon a surface to form a film of the mixture, which is then dried and the solidified film broken up into individual discrete flakes.

In another embodiment of my invention I mix particles of sodium bisulphate with a liquid adhesive, such as liquefied glue or gelatine, spread the mixture out into a film, solidify the film, as by cooling or chemical treatments and break up the solidified film into flakes.

These operations of filming, solidifying the film and breaking it up into flakes can be conducted in the standard type of equipment adapted for such operations such as drum driers, drum flakers, etc.

Produced by any of these methods the resulting products represent flakes in which particles of sodium bisulphate are embedded in a matrix of a solidified organic adhesive.

I can use in the formation of my novel flakes the usual organic adhesives such as starches, alkali starches, gums, protein glues, gelatine, casein, sulphite cellulose waste, or in general any water soluble organic adhesive of colloidal nature and high molecular weight.

The flakes produced in this manner disintegrate in contact with liquid water and are easily soluble therein.

The amount of adhesive to be used for my novel flakes does not exceed a few per cent of the weight of the sodium bisulphate to be transformed into flakes.

My novel flakes are particularly useful for cleaning purposes such as toilet bowls or for admixture with other cleaning compounds. Their specific advantage being that the acid nature of the bisulphate is greatly suppressed while in solid form and comes only into play when the flakes are in contact with water.

I claim:

1. The process of making a sodium bisulphate composition in flake form which comprises preparing a paste of sodium bisulphate particles in an organic adhesive, spreading said paste into a film, solidifying said film and breaking it up into flakes.

2. A composition of matter in the form of discrete flakes comprising particles of sodium bisulphate embedded in a matrix of a solidified organic adhesive.

ERNEST R. BOLLER.